United States Patent [19]

Burchfiel et al.

[11] Patent Number: 5,880,984
[45] Date of Patent: Mar. 9, 1999

[54] METHOD AND APPARATUS FOR PERFORMING HIGH-PRECISION MULTIPLY-ADD CALCULATIONS USING INDEPENDENT MULTIPLY AND ADD INSTRUMENTS

[75] Inventors: Steven Michael Burchfiel, Cedar Park, Tex.; Geoffrey Francis Burns, Macungie, Pa.; James H. Hesson, Austin, Tex.

[73] Assignee: International Business Machines Corporation, Armonk, N.Y.

[21] Appl. No.: 784,731

[22] Filed: Jan. 13, 1997

[51] Int. Cl.⁶ .............................. G06F 7/38; G06F 7/00
[52] U.S. Cl. .............................. 364/748.07; 364/736.02; 364/748.05; 364/748.03
[58] Field of Search .............................. 364/715.1, 715.04, 364/736.02, 748.01, 748.03, 748.05, 748.07

[56] References Cited

U.S. PATENT DOCUMENTS

| | | | |
|---|---|---|---|
| 3,878,985 | 4/1975 | Ghest et al. | 235/164 |
| 4,665,500 | 5/1987 | Poland | 364/760 |
| 4,792,793 | 12/1988 | Rawlinson et al. | 341/89 |
| 4,841,467 | 6/1989 | Ho et al. | 364/748.07 |
| 4,852,037 | 7/1989 | Aoki | 364/736 |
| 4,864,529 | 9/1989 | Shah et al. | 364/760 |
| 4,942,547 | 7/1990 | Joyce et al. | 364/748 |
| 4,943,940 | 7/1990 | New | 364/748 |
| 5,126,964 | 6/1992 | Zurawski | 364/757 |
| 5,241,493 | 8/1993 | Chu et al. | 364/748.07 |
| 5,257,217 | 10/1993 | Chiu | 364/760 |
| 5,278,781 | 1/1994 | Aono et al. | 364/736 |
| 5,379,244 | 1/1995 | Miyoshi et al. | 364/754 |
| 5,511,016 | 4/1996 | Bechade | 364/748.03 |
| 5,530,663 | 6/1996 | Garcia et al. | 364/748.07 |
| 5,671,170 | 9/1997 | Markstein et al. | 364/748.06 |
| 5,751,621 | 5/1998 | Arakawa | 364/748.07 |

OTHER PUBLICATIONS

"Design of the IBM RISC System/6000 Floating–Point Execution Unit," *IBM J. Res. Develop.*, vol. 34, No. 1, Jan. 1990, pp. 59–70.

"Floating–Point Data," Book 1, *PowerPC User Instruction Set Architecture*, pp. 141–183.

*Primary Examiner*—Ayaz R. Sheikh
*Assistant Examiner*—Douglas S. Lee

[57] ABSTRACT

A floating point arithmetic unit for performing independent multiply and add operations in the execution of a multiply-add instruction AC+B on three operands A, B, and C of p-bit precision includes a multiplier unit, a sticky collect unit, an adder unit, and a rounding unit. In addition, a risk condition detection unit provides detection of a risk condition corresponding to an occurrence of an imprecise resultant quantity prior to being rounded by the rounding unit. Upon detection of a risk condition, a trap is triggered and an extended sequence implementation unit carries out an extended multiply-add sequence and provides a multiply-add output having infinite precision prior to a final rounding. A floating point arithmetic method for performing independent multiply and add operations in the execution of a multiply-add instruction AC+B on three operands A, B, and C of p-bit precision is disclosed also.

10 Claims, 3 Drawing Sheets

METHOD AND APPARATUS FOR PERFORMING HIGH-PRECISION MULTIPLY-ADD CALCULATIONS USING INDEPENDENT MULTIPLY AND ADD INSTRUMENTS

BACKGROUND OF THE INVENTION

1. Field of the Invention

This invention relates generally to superscalar microprocessors and, more particularly, to a method and apparatus for performing high precision multiply-add calculations using independent multiply and add instructions.

2. Discussion of the Related Art

Reduced instruction set computer (RISC) microprocessors are known in the art. RISC processors include major functional components in accordance with a particular system architecture. For example, the RISC processor may include three execution units, such as, an integer unit, a branch processing unit, and a floating-point unit. As such, the RISC processors comprise superscalar processors which are capable of issuing and retiring, for example, three instructions per clock, one to each of the three execution units. Instructions can complete out of order for increased performance, wherein, the execution may actually appear sequential.

The design of floating point hardware and algorithms for advanced microprocessors often involves tradeoffs between performance, floating point accuracy, and compatibility with existing software applications in the advanced microprocessor market.

In the discussion to follow, reference will be made to the different floating point formats for single, double, and extended precision. FIG. 1 illustrates the floating point binary fixed length format for single-precision, double-precision, and extended-precision. Various computer microprocessor architectures utilize operand conventions for storing values in registers and memory, accessing the microprocessor registers, and representation of data in those registers. The single-precision format may be used for data in memory. The double-precision format may be used for data in memory or in floating-point registers.

Values in floating-point format consist of three fields: s(sign bit), exp(exponent), and FRACTION(mantissa). The length of the sign bit is a single bit. The lengths of the exponent and fraction fields depend upon the particular precision format. For single precision, the floating-point format includes 32 bits, wherein the sign bit is 1 bit, the exponent bit is 8 bits, and the mantissa is 23 bits. For double precision, the floating-point format includes 64 bits, wherein the sign bit is 1 bit, the exponent bit is 11 bits, and the mantissa is 52 bits. For extended precision, the floating-point format includes 81 bits, wherein the sign bit is 1 bit, the exponent bit is 16 bits, and the mantissa is 64 bits. In addition, with respect to the floating-point representation, a significand consists of a leading implied bit concatenated on the right with the FRACTION. This leading implied bit is a 1 (one) for normalized numbers and a 0 (zero) for denormalized numbers. The leading implied bit is located in the unit bit position (i.e., the first bit position to the left of the binary point).

Numerical and non-numerical values are representable within the single-precision, double-precision, and extended-precision formats. The numerical values are approximations to the real numbers and include the normalized numbers, denormalized numbers, and zero values. Additionally, non-numerical numbers representable include the positive and negative infinities.

Binary floating-point numbers are machine-representable values used to approximate real numbers. Three categories of numbers include: normalized numbers, denormalized numbers, and zero values. The values for normalized numbers have a biased exponent value in the range of 1–256 for the single-precision floating-point format and 1–2046 for the double-precision floating-point format. The implied unit bit is one for normalized numbers. Furthermore, normalized numbers are interpreted as follows:

$$\text{NORM} = (-1)^S \times 2^E \times (1.\text{fraction})$$

where (S) is the sign, (E) is the unbiased exponent, and (1.fraction) is the significand composed of a leading unit bit (implied bit) and a fractional part. Zero values have a biased exponent value of zero and a mantissa (leading bit=0) value of zero. Zeros can have a positive or negative sign. Denormalized numbers have a biased exponent value of zero and a non-zero fraction field value. Denormalized numbers are nonzero numbers smaller in magnitude than the representable normalized numbers. They are values in which the implied unit bit is zero. Denormalized numbers are interpreted as follows:

$$\text{DENORM} = (-1)^S \times 2^{E_{min}} \times (0.\text{fraction})$$

where (S) is the sign, (Emin) is the minimum representable exponent value (−126 for single-precision, −1022 for double-precision), and (0.fraction) is the significand composed of a leading bit (implied bit) and a fractional part.

When an arithmetic operation produces an intermediate result, consisting of a sign bit, an exponent, and a non-zero significand with a zero leading bit, the result is not a normalized number and must be normalized before it is stored. A number is normalized by shifting its significand left while decrementing its exponent by one for each bit shifted, until the leading significand bit becomes one. The guard bit and the round bit participate in the shift with zeros shifted into the round bit. During normalization, the exponent is regarded as if its range were unlimited. If the resulting exponent value is less than the minimum value that can be represented in the format specified for the result, then the intermediate result is said to be "tiny". The sign of the number does not change. When an arithmetic operation produces a nonzero intermediate result whose exponent is less than the minimum value that can be represented in the format specified, the stored result may need to be denormalized. A number is denormalized by shifting its significand to the right while incrementing its exponent by one for each bit shifted until the exponent equals the format's minimum value. If any significant bits are lost in this shifting process, then a loss of accuracy has occurred. The sign of the number does not change.

All arithmetic, rounding, and conversion instructions are defined by the microprocessor architecture to produce an intermediate result considered infinitely precise. This result can be written with a precision of finite length into a floating point register (FPR). After normalization or denormalization, if the infinitely precise intermediate result cannot be represented in the precision required by the instruction, it is rounded before being placed into the target FPR. Rounding is performed in accordance with particular rounding instructions specific to a particular microprocessor.

The IEEE 754 standard includes 64- and 32-bit arithmetic. The standard requires that single-precision arithmetic be provided for single-precision operands. The standard permits double-precision arithmetic instructions to have either (or both) single-precision or double-precision operands, but states that single-precision instructions should not accept double-precision operands.

In a 64-bit execution model for IEEE operations, the bits and field are defined as follows: the S bit is the sign bit; the C bit is the carry bit that captures the carry out of the significand; the L bit is the leading unit bit of the significand which receives the implicit bit from the operands; the FRACTION is a 52-bit field, which accepts the fraction of the operands; and the guard (G), round (R), and sticky (X) bits are extensions to the low-order bits of the accumulator. The G and R bits are required for post-normalization of the result. The G, R, and X bits are required during rounding to determine if the intermediate result is equally near the two nearest representable values. The X bit serves as an extension to the G and R bits by representing the logical OR of all bits that may appear to the low-order side of the R bit, either due to shifting the accumulator right or other generation of low-order result bits. The G and R bits participate in the left shifts with zeros being shifted into the R bit. The significand of an intermediate result is made up of the L bit, the FRACTION, and the G, R, and X bits. The infinitely precise intermediate result of an operation is the result normalized in bits L, FRACTION, G, R, and X of the floating point accumulator. Before results are stored into a FPR (floating point register), the significand is rounded if necessary, using the rounding mode specified by FRSCR [RN] (FRSCR—floating point status and control register, RN—rounding mode). If rounding causes a carry into C, the significand is shifted right one position and the exponent is incremented by one. This could possibly cause an exponent overflow. Fraction bits to the left of the bit position used for rounding are stored into the FPR, and low-order bit positions, if any, are set to zero.

In accordance with the IEEE 754 standard, four rounding modes are provided which can be user-selectable through FRSCR[RN]. For rounding, the conceptual guard, round, and sticky bits are defined in terms of accumulator bits. The positions of the guard, round, and sticky bits for a double-precision floating point number are bit 53 (G bit), bit 54 (R bit), and bit 55 (X bit) of the accumulator. For a single-precision floating point number, the positions of the guard (G), round (R), and sticky (X) bits are bit 24, bit 25, and bits (26–52,G,R,and X) of the accumulator.

Rounding can be treated as though the significand were shifted right, if required, until the least significant bit to be retained is in the low-order bit position of the FRACTION. If any of the guard, round, or sticky bits are nonzero, then the result is inexact. The guard bit is bit 53 of the intermediate result. The round bit is bit 54 of the intermediate result. The sticky bit is the OR of all remaining bits to the right of the bit 55, inclusive.

If an operand is a denormalized number, then it is prenormalized before the operation is started. If the most significant bit of the resultant significand is not a one, then the result is normalized. The result is rounded to the target precision under control of the floating-point rounding control field RN of the FPSCR and placed into frD (floating point destination register D).

In accordance with a particular microprocessor system architecture, TRAP instructions may be provided to test for a specific set of conditions. If any of the conditions tested by a trap instruction are met, the system trap handler is invoked. If the tested conditions are not met, instruction execution continues normally.

In conjunction with the above floating-point discussion, one particular example of an instruction in a superscalar computing machine is the implementation of an integrated multiply-add instruction $(+/-(A*C)+/-B)$ in an advanced microprocessor architecture, such as in the Power/PowerPC family of RISC microprocessors available from International Business Machines Corporation of Armonk, N.Y. The integrated multiply-add instruction, $(+/-(A*C)+/-B)$, is typically executed in a Multiply Accumulate (MAC) unit of the RISC microprocessor. Advanced microprocessor architecture implementations have supported the multiply-add instruction in a single unit, for example unit 10 of FIG. 2, (i.e., a fused multiply-add unit) which accepts the three operands A, B, and C. With the floating-point multiply-add instruction, the floating point operand in register frA (floating point register A) identified by reference numeral 12 is multiplied by the floating point operand in register frC (floating point register C) identified by referenced numeral 14. The floating-point operand in register frB (floating point register B) identified by reference numeral 16 is added to the intermediate result $A*C$. A high precision is achieved through elimination of an intermediate rounding of the product $A*C$ prior to addition with the summand B. Such an implementation is illustrated, for example, in FIG. 2, where p is representative of the operand precision. While such a fused multiply-add unit 10 provides a benefit in which the rounding of the product $A*C$ prior to the addition of B is avoided and only a single rounding of the final result is executed, the fused multiply-add unit has disadvantages. For example, one major disadvantage in implementing a fused multiply-add unit in a superscalar processor is that a best performance cannot be obtained, that is, concurrent multiply and add instructions for the multiply-add instruction are not possible.

In superscalar computing machines which execute instructions out-of-order, improved performance is achieved by allowing the multiplication and addition to proceed independently, in separate units respectively optimized for minimum latency of the multiply and add operations. Individual add and multiply units are contained, for example, in an Intel x86 based processor, available from Intel Corporation of Santa Clara, Calif. In addition, the x86 processor is formatted for extended precision (i.e., each of the floating point registers contains 81 bits). Multiplication of two 64 bit mantissas results in a 128 bit intermediate result, which is subsequently rounded to 64 bits for the 81 bit extended precision format. Such an implementation is illustrated, for example, in FIG. 3, where p is representative of the operand precision. When executing a multiply-add sequence with independent units, precision is lost due to an intermediate round of the $A*C$ product prior to the addition of operand B, unless a full precision datapath width of 2p is carried from the multiply unit to the add unit. Doubling the width of the datapath, the supporting units, and the registers is in most cases prohibitively expensive in terms of microprocessor silicon area and complexity.

It would thus be desirable to provide an improved solution for the independent unit approach to produce equivalent results to the integrated multiply-add implementations.

SUMMARY OF THE INVENTION

It is an object of the present invention to implement a multiply-add instruction in a processor which has independent multiply and add execution units.

In accordance with the method and apparatus of the present invention, a best performance of a multiply-add instruction is accomplished by having separate multiply and add units which operate independently and execute two instructions in parallel. The present invention achieves a higher precision offered in a multiply-add instruction of a superscalar machine which includes separate multiply and add units. The present invention furthermore provides an inexpensive hardware implementation of the multiply-add instruction, identification of situations where an extended sequence of six instructions must be executed.

In accordance with the present invention, a floating point arithmetic unit and method performs independent multiply and add operations in the execution of a multiply-add instruction on three operands A, B, and C, each operand having p bits in accordance with a given floating-point precision. The arithmetic unit includes a multiplier unit having an input stage for receiving operands A and C and further having a datapath width of d bits, wherein $p<d \leq 2p$. The input stage includes a respective buffer of b bits of zeros (0's) concatenated to the right of a respective least significant bit of each of operands A and C, wherein b is equal to d–p bits. The multiplier unit further includes an output stage for conveying a product A*C including d upper order bits $AC_{UPPER}$ and d lower order bits $AC_{LOWER}$. A sticky collect unit receives $AC_{LOWER}$ and generates a sticky bit representative of a logical OR of all of the bits of $AC_{LOWER}$, wherein the sticky bit equals one (1) upon any of the bits of $AC_{LOWER}$ being one (1). An adder unit having an input stage for receiving $AC_{UPPER}$ and operand B includes a datapath of d bits. The input stage of the adder unit includes a buffer of b bits of zeros (0's) concatenated to the right of a least significant bit of operand B, where b is equal to d minus p bits. The adder unit further includes an output stage for providing a resultant quantity +/– $AC_{UPPER}$+/– B. The multiplier unit, the sticky collect unit, and the adder unit implement an integrated multiply-add sequence. A rounding means rounds the resultant quantity +/– $AC_{UPPER}$+/– B to a precision of p bits in response to the sticky bit and further in accordance to a desired rounding mode. The rounding means further provides a multiply-add output of the arithmetic unit. A risk condition detection means detects an occurrence of either a first risk condition or a second risk condition in connection with the resultant quantity prior to a rounding of the resultant quantity by the rounding means. The first risk condition is indicative of an undesirable cancellation on the resultant quantity +/– $AC_{UPPER}$+/– B and the second risk condition is indicative of a specific loss of precision in the resultant quantity +/– $AC_{UPPER}$+/– B. Upon a detection of a risk condition, the risk condition detection means further triggers a trap for discarding the original resultant quantity +/– $AC_{UPPER}$+/– B and for initiating an extended multiply-add sequence. Lastly, an implementation means implements the extended multiply-add sequence upon the three operands A, B, and C in response to the trap for providing a multiply-add output of the arithmetic unit, wherein the extended multiply-add sequence is selected for achieving mathematical compatibility with the integrated multiply-add sequence.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

In accordance with the present invention, implementation of a multiply-add instruction is accomplished with independent multiply and add hardware units. In addition, with the arithmetic unit of the present invention, equivalent results to the integrated multiply-add implementation are achieved without a doubling of the datapath or register width. Still further, the performance of a concurrent two-instruction sequence is obtained.

As will be discussed in further detail herein below, several features achieve the desirable design point in accordance with the present invention as follows. Firstly, a multiply-add instruction sequence consists of an initial multiply (A*C) followed by a single add ($AC_{UPPER}$+B). Secondly, the datapath width is widened by a small number of bits beyond a target precision (referred to herein as a buffer). For example, in a preferred embodiment, the datapath is widened by a buffer equal to 11 bits. Thirdly, a unique sticky bit is formed from the logical OR across the truncated lower-order product bits $AC_{LOWER}$. Fourthly, first and second risk conditions, detectable in a final add and which identify a probable occurrence for achieving different results from the integrated multiply-add unit, are identified. Lastly, dynamic detection of the first and second risk conditions in the final add triggers a hardware trap to discard the original product results, and restart with a six instruction, extended multiply-add sequence, such as is detailed by Equation 1, presented herein below. The risk conditions are thus utilized for initiating an execution of the extended sequence.

Figure 1:
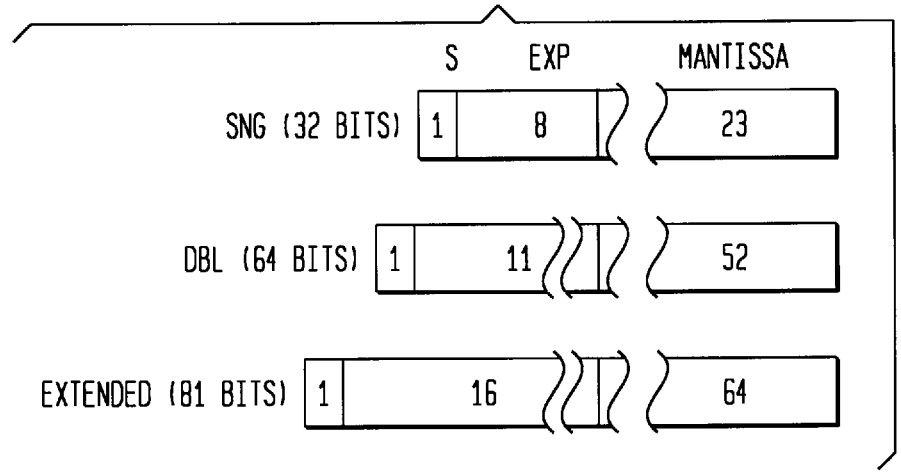
FIG. 1 shows floating-point precision formats for single-precision (32 bits), double-precision (64 bits), and extended-precision (81 bits)
Figure 2:
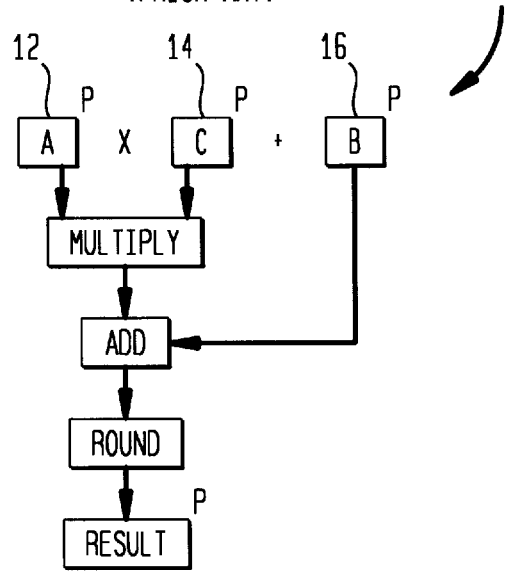
FIG. 2 shows a flow diagram implementation of an integrated multiply-add instruction, (+/–(A*C)+/–B), in a fused multiply-add unit of a known advanced microprocessor architecture.
Figure 3:
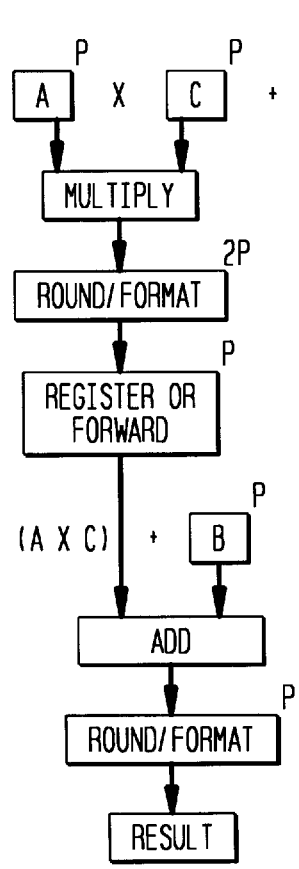
FIG. 3 shows a flow diagram implementation of a multply-add operation implemented with independent multiply and add units of a known advanced microprocessor architecture.
Figure 4:
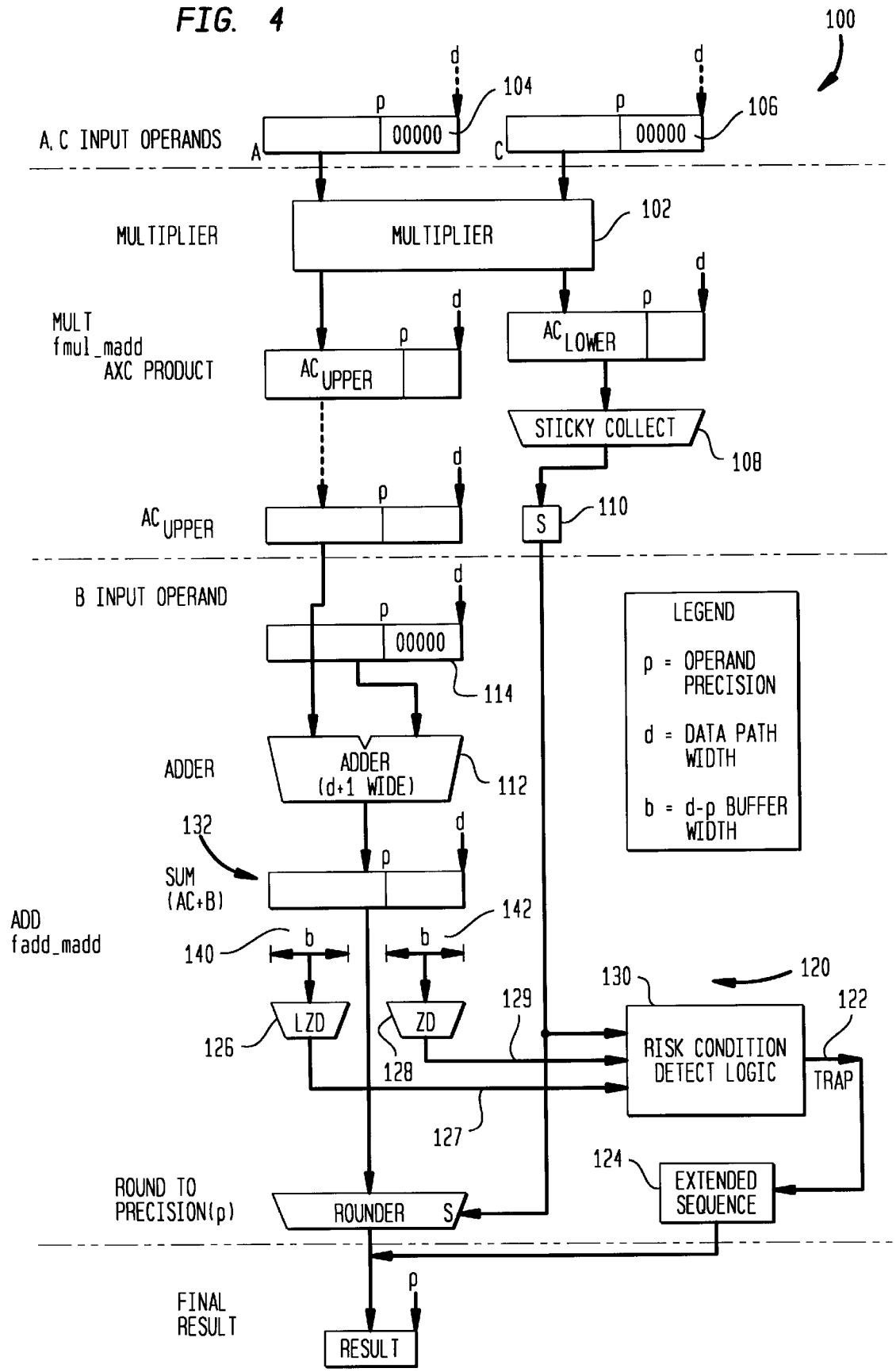
FIG. 4 illustrates a flow diagram implementation of a multiply-add operation implemented with independent multiply and add units in accordance with the present invention.
Figure 5:
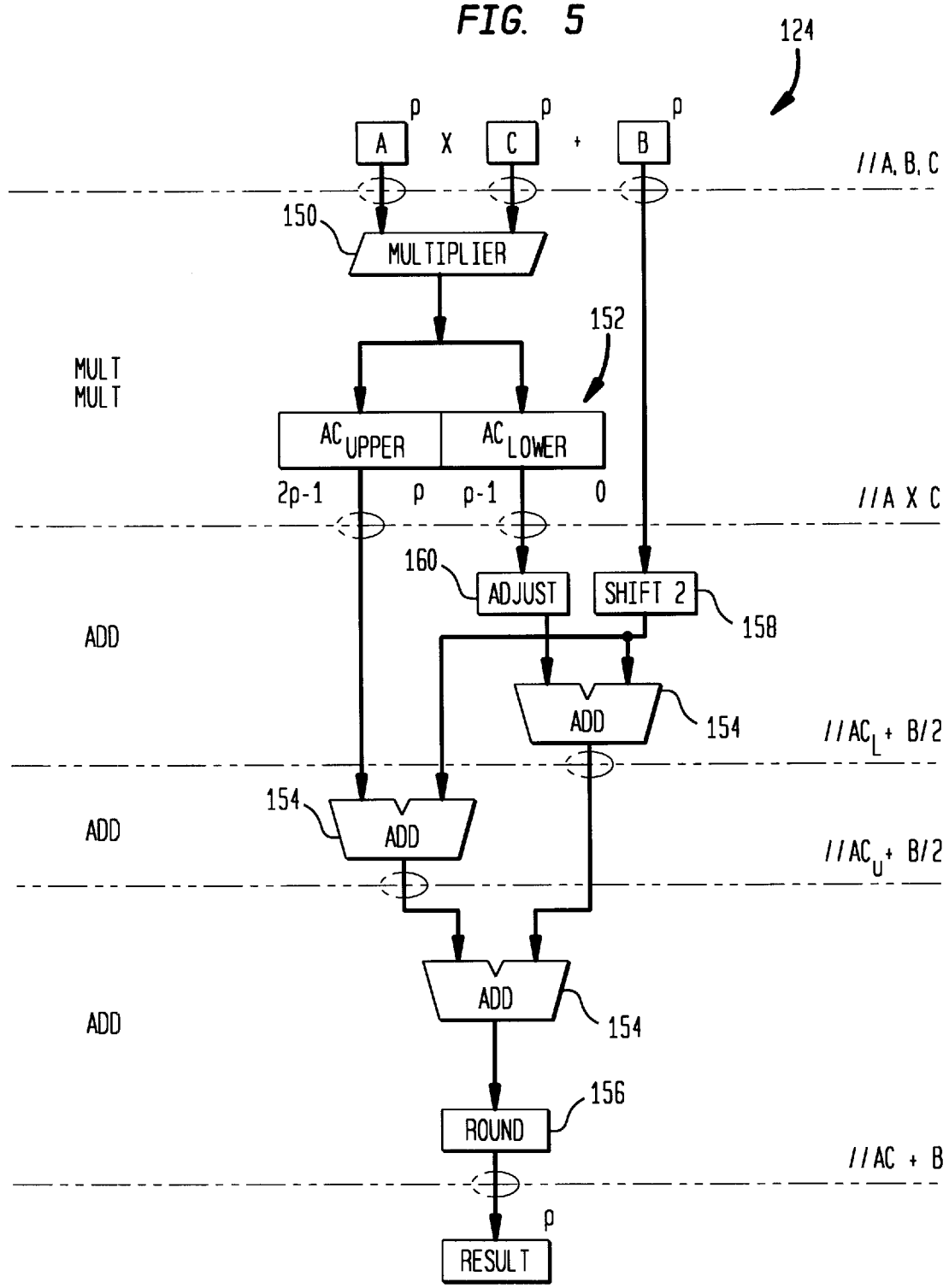
FIG. 5 illustrates a flow diagram implementation of an extended sequence of the multiply-add operation implemented with independent multiply and add units in accordance with the present invention.

Referring now to FIGS. 4 and 5, a floating point arithmetic unit 100 for performing independent multiply and add operations in the execution of a multiply-add instruction on three operands A, B, and C shall now be described. Operand A is a multiplicand, operand C is a multiplier and operand B is an addend. Each operand includes data of a prescribed number of p bits in accordance with a given floating-point precision. The p bits include one (1) sign bit indicating if a data represents a positive (+) or a negative (–) value, x exponent bits, and y mantissa bits.

Arithmetic unit 100 includes a multiplier unit 102 having an input stage for receiving operands A and C. The input stage includes an external datapath width of d bits, wherein $p<d \leq 2p$. The input stage further includes a respective buffer (104, 106) of b bits of zeros (0's) concatenated to the right of a respective least significant bit of each of operands A and C. Preferably, b is equal to d–p bits. The multiplier unit 102 further includes an output stage for conveying a product A*C. The product A*C includes d upper order bits $AC_{UPPER}$ and d lower order bits $AC_{LOWER}$.

A sticky collect unit 108 is provided, as shown in FIG. 4, for receiving $AC_{LOWER}$ and generating a unique sticky bit 110 representative of a logical OR of all of the bits of $AC_{LOWER}$. The sticky bit 110 equals one (1) upon any of the bits of $AC_{LOWER}$ being one (1). The sticky collect unit 108 includes a standard floating point sticky collector. The unique sticky bit 110 becomes a special tag which is thereafter associated with $AC_{UPPER}$.

An adder unit 112 includes an input stage for receiving $AC_{UPPER}$ and operand B. The adder unit 112 further includes an external datapath width of d bits, and further wherein the input stage includes a buffer 114 of b bits of zeros (0's) concatenated to the right of a least significant bit of operand B. Similarly as discussed above, the buffer 114 contains b bits, where b bits is equal to d minus p bits. The adder unit 112 further includes an output stage for providing a resultant quantity $+/- AC_{UPPER} +/- B$.

In a preferred embodiment of the floating point arithmetic unit 100 of the present invention, the multiplier unit 102 includes an internal datapath width of 2d bits and the adder unit 112 includes an internal datapath width of d+1 bits. The multiplier unit 102 and the adder unit 112 are further interconnected by an external communication link of d bits and capable of producing resultant quantities having a precision of $p \leq d$. Alternatively, the multiplier unit 102 and the adder unit 112 each further includes an 81-bit internal communication link including one (1) sign bit, sixteen (16) exponent bits, and sixty-four (64) mantissa bits.

Referring still to FIG. 4, a rounding means 116 is provided for rounding the resultant quantity $+/- AC_{UPPER} +/- B$ to a precision of p bits in response to the unique sticky bit 110 and further in accordance to a desired rounding mode. The rounding means 116 further provides a multiply-add output of the arithmetic unit 100, the multiply-add output corresponding to a final result.

In conjunction with arithmetic unit 100 of the present invention, a risk condition detection means 120 is provided for detecting an occurrence of either a first risk condition or a second risk condition. The first and second risk conditions arise in connection with the resultant quantity prior to a final rounding of the resultant quantity by the rounding means 116. The first risk condition is indicative of an undesirable cancellation on the resultant quantity $+/- AC_{UPPER} +/- B$, whereas, the second risk condition is indicative of a unique loss of precision in the resultant quantity $+/- AC_{UPPER} +/- B$. The risk condition detection means 120 further triggers a hardware trap 122 upon a detection of either one of the first or second risk conditions. Upon triggering, the trap 122 discards the resultant quantity $+/- AC_{UPPER} +/- B$ existing at that point and further initiates an extended multiply-add sequence 124.

The risk condition detection means includes a leading zero detect (LZD) means 126, a zero detect(ZD) means 128, and suitable logic means 130. The LZD means 126 detects if the first "b" leading bits 140 of the resultant quantity 132 are all zero. In addition, the LZD means 126 provides a LZD output 127 having a first state representative of the first "b" leading bits all being zero. The zero detect (ZD) means 128 detects if the last "b" bits 142 of the low order bits of the resultant quantity 132 are all zero, and furthermore provides a ZD output 129 having a first state representative of the last "b" bits of the low order bits all being zero. Lastly, risk condition detection logic means 130 is responsive to the sticky bit 110, the LZD output 127, and the ZD output 129 for I) triggering the trap 122 upon detecting the first risk condition corresponding to the sticky bit 110 equal to one (1) and the LZD output 127 being in the first state, and ii) triggering the trap 122 upon detecting the second risk condition corresponding to the sticky bit 110 equal to one (1) and the ZD output 129 being in the first state. The specific implementation of the leading zero detect 126, zero detect 128, and logic means 130 can be fabricated using any suitable logic circuit technique known in the art, for implementing the required logical functions.

In further discussion of the risk condition detection logic, if either of the first or the second risk conditions are detected, then an extended multiply-add sequence must be executed. With respect to the first risk condition, a subtraction cancellation causes an unrecoverable loss of precision. In this regard, the sticky collect 108 output is indicative of the sticky bit 110 equal to 1 or "ON", and the LZD means 126 indicates a cancellation of b bits 140 (where b=d−p). In other words, there were greater than p bits of an undesirable cancellation on the sum prior to the final rounding. With respect to the second risk condition, a loss of precision is caused by an addition of B to the truncated region of the AC product, wherein a carry occurs across the region between $AC_{UPPER}$ and $AC_{LOWER}$. Determination of the second risk condition thus includes determining if the $AC_{UPPER}$ product encounters an addition or subtraction to the low order bit thereof. In this regard, the sticky collect 108 output is indicative of the sticky bit 110 equal to 1 or "ON", and the ZD means 128 indicates that the lower order b bits 142 (where b=d−p) are equal to zero. To maintain precision, the addition of B now requires full precision of the $AC_{LOWER}$ region for obtaining a correct result with full precision.

The extended multiply-add sequence for use in accordance with the present invention is preferably implemented using a narrowed datapath. In the preferred implementation, such as illustrated in FIG. 5, an intermediate multiply is performed twice. During a first multiply, the upper p bits of a partial product $AC_{(2p-1:p)}$ are produced. A second multiply produces the lower p bits of the partial product $AC_{(p-1:0)}$. Multiply-addition is then accomplished with three passes through an adder in accordance with the following operation:

$$AC + B = \left( AC_{(2p-1:p)} + \frac{B}{2} \right) + \left( AC_{(p-1:0)} + \frac{B}{2} \right) \quad \text{(EQ. 1)}$$

The extended multiply-add sequence then requires a total of four separate instructions. It should also be noted that the lower order product term $AC_{(p-1:0)}$ requires renormalization, entailing either further hardware complexity or a separate renormalization instruction. Alternatively, any extended sequence to achieve mathematical compatibility with the integrated multiply-add sequence can be used.

Referring to FIGS. 4 and 5, a means 124 for implementing the extended multiply-add sequence upon the three operands A, B, and C shall now be discussed in greater detail. As indicated above, an extended multiply-add sequence is initiated in response to the trap 122. The extended sequence implementation means 124 implements the extended sequence and further provides a multiply-add output of the arithmetic unit 100 upon the occurrence of a risk condition. The extended multiply-add sequence implementation means 124 includes a multiplier means 150 having a narrowed datapath width of p bits for receiving operands A and C. The multiplier means 150 performs a first and a second multiply for providing an intermediate product A*C result 152. The intermediate product A*C includes a partial product of p upper order bits $AC_{(2p-1:p)}$ and a partial product of p lower order bits $AC_{(p-1:0)}$. An adder means 154 is provided for the execution of three passes through an adder unit in accordance with the following operation:

$$AC + B = \left( AC_{(2p-1:p)} + \frac{B}{2} \right) + \left( AC_{(p-1:0)} + \frac{B}{2} \right).$$

An intermediate resultant quantity AC+B of infinite precision is thus produced. Lastly, a rounding means 156 is provided for rounding the intermediate resultant quantity AC+B to a precision of p bits. The rounding means 156 further provides an output corresponding to the multiply-add output of the arithmetic unit 100 of the present invention.

In conjunction with the above discussion, the means for executing three passes through an adder unit further includes a shifting means 158 having an input stage for receiving operand B and for providing an output quantity B/2, and an adjustment means 160 for adjusting the lower order partial product $AC_{(p-1:0)}$ to be aligned with the quantity B/2 in preparation for an addition therewith. The upper order partial product $AC_{(2p-1:p)}$ is then added to the quantity B/2 to form a first intermediate quantity $AC_{(2p-1:p)}$+B/2. The aligned partial product $AC_{(p-1:0)}$ is added to the quantity B/2 to form a second intermediate quantity $AC_{(p-1:0)}$+B/2. Lastly, the first and second intermediate quantities are added together to form the intermediate resultant quantity AC+B.

Implementation of the extended sequence as discussed above with respect to FIG. 5, may be implemented utilizing a hardware state machine or low level code to control independent multiply and add dataflow pipes to produce an AC+B result which is accurate to infinite precision prior to a final rounding. In the first stage, the multiplier produces an AC result which is twice as wide as the A and C operands, individually. The result is divided into an $AC_{UPPER}$ and $AC_{LOWER}$ portion for providing movement through the limited width adder and dataflow paths. Three adders are used to produce the AC+B result. Integrated multiply-adds in accordance with the present invention prevent a loss of performance between the independent multiply and add sequences. Note that the multiply-add operation on input operands of width p is capable of producing a result of width 3p utilizing standard rounding conventions as defined in the IEEE 754 floating point standard.

The high performance multiply add implementation of the present invention with detection of risk conditions has been discussed herein with respect to FIG. 4. If either risk condition is detected, a loss of precision has occurred and the full multiply-add sequence of FIG. 5 must be used. In the high performance implementation, the standard AC multiply operation is performed and truncated, the datapath with the least significant bit contains a standard sticky bit formed from the remaining product, as discussed herein above. The sticky is collected and later checked with the assumption that only a sticky is required to produce an infinitely precise result. After the addition of B, the risk condition detector will indicate if that assumption was correct or incorrect. Risk conditions can be minimized by extending the width of the adder as desired. In FIG. 4, the adder stage shows a datapath width of d bits (d>p, and the datapath is b bits (b=d−p) wider than input operand precision).

After addition of the B operand, a leading zero detect is used to determine if the final result will require normalization. The width of the leading zero detect is the same as the width of the datapath buffer. Hence, it can be determined if the truncation of the AC product will find its' way into the final result. The buffer allows the datapath to be normalized to the left by b bits without loss of precision. If the final result requires normalization of more than b bits, the truncation of the AC product will produce an inaccurate result. Since it is assumed the original multiply operands are normalized, the only time a leading zero occurs in the results is when the B operand is effectively subtracted from AC. For the risk condition to occur, at least b bits must be canceled, which is further considered a massive cancellation.

The second risk condition occurs when the addition of the B operand causes a carry across the buffer area b, thus incrementing the $AC_{UPPER}$ product. It cannot be determined whether the carry (or borrow) occurred as a result of the truncation of the AC product, so the operation must be re-executed with the extended sequence. This assumption is based upon the fact that the AC product will have a leading one and contain the full precision of the result. If the B operand aligns below the $AC_{UPPER}$ result, it may affect the $AC_{UPPER}$ result and subsequently the final result. By examining the final round, the buffer area for zeros, and the initial sticky collection after the AC product, it can be determined if a loss of accuracy has occurred.

Widening the datapath to a small number of additional bits renders the risk conditions (mentioned above) sufficiently rare to prevent appreciable performance degradation from occasional traps to the extended multiply-add sequence. For example, with a double-precision format, the datapath of 53 bits (with one implied leading bit to the left of the decimal point) is widened by 11 bits to form a 64 bit datapath. In numerous instances herein, the term "datapath" is/has been used. When referring to datapath, we are referring only to the mantissa portion of the precision format.

In connection with the above features, the arithmetic unit and method in accordance with the present invention advantageously provides a characterization of the risk conditions during intermediate arithmetic operations, for obtaining imprecise results for the composite operation. In addition, the implementation of hardware detection of the risk conditions during an intermediate arithmetic operation advantageously allows either the precise results to be quickly completed or an extended precision sequence to be initiated for overriding the first results. The extended multiply-add sequence, detailed in Equation 1, achieves full precision multiply-add results by operating separately on the upper and lower order A*C product results.

Implementation Example

The present invention may further be described with respect to the following example, in which double precision (1 sign bit, 11 exponent bits, and 53 effective mantissa bits) is selected as a target format. The individual units (i.e., multiplication and add units), datapath, and registers support an internal 81-bit format (1 sign bit, 16 exponent bits, and 64 mantissa bits). In connection with the present invention, accuracy of the 2-instruction multiply-add has been determined to differ from that of the integrated multiply add under the following two circumstances:

1. AC +/− B is subtractive, with AC and B of comparable magnitude. In this instance, during a final add/subtract, the mantissa precision is lost through a partial cancellation of the AC and B terms (corresponding to a massive cancellation). In comparison with the integrated instruction multiply-add, the independent instruction multiply-add implementation may be potentially less accurate when the product and subtrahend exponents differ by less than 11. This condition is easily detected internal to the adder immediately after the mantissa add, where a leading zero detect (LZD) is implemented to control sum renormalization. If the LZD count exceeds 10, then the mantissa accuracy may be less than would have been obtained in an integrated multiply-add, necessitating instruction replay using the extended sequence in Equation 1.

2. Addition or subtraction between the lower order product bits—which are retained in the integrated instruction (fmadd) multiply-add implementation but discarded after the multiply in the independent instruction (fmadd) multiply-add in accordance with the present invention— and the addend term are decisive in determining the outcome of the final round. This particular situation has been analyzed and identified, wherein, the risk conditions are identified from the sum mantissa prior to rounding, as this is also a convenient point to implement a trap condition detector. It has been found that all risk conditions share a continuous 10-bit field of zeros, in itself a rare event, and thus it is sufficient to simply trap on a 10-bit zero detect. For implementations with fewer extra bits, it may be necessary to decode the least significant bit (LSB) and guard bits as well to minimize unneeded traps to the extended sequence.

There has thus been shown a floating point method and apparatus for implementing a multiply-add instruction accomplished with independent multiply and add units which provides infinite intermediate precision. Such a method and apparatus further provides an improved throughput. Furthermore, the present invention provides a single floating point unit capable of executing multiply-add instructions from a PowerPC core instruction set and obtain a same result. Still further, the floating point method and apparatus of the present invention is able to execute multiply and add x86 core instructions for implementation of full precision multiply-add instructions. As discussed herein, the present invention advantageously implements a double-precision multiply-add instruction with extended precision independent multiply and add units. The precision of the numbers is 53 bits, while the data flow precision is 64 bits.

While the invention has been particularly shown and described with reference to specific embodiments thereof, it will be understood by those skilled in the art that various changes in form and detail may be made thereto, and that other embodiments of the present invention beyond embodiments specifically described herein may be made or practice without departing from the spirit of the invention. Similarly, other changes, combinations and modifications of the presently disclosed embodiments will also become apparent. The embodiments disclosed and the details thereof are intended to teach the practice of the invention and are intended to be illustrative and not limiting. Accordingly, such apparent but undisclosed embodiments, changes, combinations, and modifications are considered to be within the spirit and scope of the present invention as limited solely by the appended claims.

What is claimed is:

1. A floating point arithmetic unit for performing independent multiply and add operations in the execution of a multiply-add instruction on three operands A, B, and C, wherein A being the multiplicand, C being the multiplier and B being the addend, and each operand comprising data of a prescribed number p of bits in accordance with a given floating-point precision including one (1) sign bit indicating if a data represents a positive (+) or a negative (−) value, x exponent bits, and y mantissa bits, said arithmetic unit comprising:

(a) a multiplier unit including an input stage for receiving operands A and C and having an external datapath width of d bits, wherein $p < d \leq 2p$, and further wherein the input stage includes a respective buffer of b bits of zeros (0's) concatenated to the right of a respective least significant bit of each of operands A and C, wherein b is equal to d−p bits, said multiplier unit further including an output stage for conveying a product A*C including d upper order bits $AC_{UPPER}$ and d lower order bits $AC_{LOWER}$;

(b) a sticky collect unit for receiving $AC_{LOWER}$ and generating a sticky bit representative of a logical OR of all of the bits of $AC_{LOWER}$, wherein the sticky bit equals one (1) upon any of the bits of $AC_{LOWER}$ being one (1);

(c) an adder unit having an input stage for receiving $AC_{UPPER}$ and operand B and having an external datapath width of d bits, and further wherein the input stage includes a buffer of b bits of zeros (0's) concatenated to the right of a least significant bit of operand B, wherein b is equal to d minus p bits, said adder unit further including an output stage for providing a resultant quantity +/− $AC_{UPPER}$+/− B, wherein said multiplier unit, said sticky collect unit, and said adder unit implement an integrated multiply-add sequence;

(d) means for rounding the resultant quantity +/− $AC_{UPPER}$+/− B to a precision of p bits in response to the sticky bit and further in accordance to a desired rounding mode, said rounding means further providing a multiply-add output of said arithmetic unit;

(e) means for detecting an occurrence of either a first risk condition or a second risk condition in connection with the resultant quantity prior to a rounding of the resultant quantity by said rounding means, the first risk condition indicative of an undesirable cancellation on the resultant quantity +/− $AC_{UPPER}$+/− B and the second risk condition indicative of a specific loss of precision in the resultant quantity +/− $AC_{UPPER}$+/− B, said risk condition detection means further for triggering a trap upon a detection of a risk condition, the trap for discarding the resultant quantity +/− $AC_{UPPER}$+/− B and further for initiating an extended multiply-add sequence; and (f) means for implementing the extended multiply-add sequence upon the three operands A, B, and C in response to the trap and providing a mouthily-add output of said arithmetic unit, wherein the extended multiply-add sequence is selected for achieving mathematical compatibility with the integrated multiply-add sequence, wherein said extended multiply-add sequence implementation means includes a multiplier means having a narrowed datapath width of p bits for receiving operands A and C and performing a first and a second multiply for providing an intermediate product A*C including a partial product of p upper order bits $AC_{(2p-1:p)}$ and a partial product of p lower order bits $AC_{(p-1:0)}$;

an adder means for executing three passes through an adder unit in accordance with the following operation:

$$AC + B = \left( AC_{(2p-1:p)} + \frac{B}{2} \right) + \left( AC_{(p-1:0)} + \frac{B}{2} \right),$$

and providing an intermediate resultant quantity AC+B of infinite precision; and a means for rounding the intermediate resultant quantity AC+B to a precision of p bits and providing an output corresponding to the multiply-add output of said arithmetic unit.

2. The floating point arithmetic unit according to claim 1, further wherein said means for executing three passes through an adder unit further includes shifting means having an input stage for receiving operand B and for providing an output quantity B/2, and adjustment means for adjusting the lower order partial product $AC_{(p-1:0)}$ to be aligned with the quantity B/2 in preparation for an addition therewith, wherein the upper order partial product $AC_{(2p-1:p)}$ is added to the quantity B/2 to form a first intermediate quantity $AC_{(2p-1:p)}$+B/2, the aligned partial product $AC_{(p-1:0)}$ is added to the quantity B/2 to form a second intermediate quantity $AC_{(p-1:0)}$+B/2, and the first and second intermediate quantities are added to form the intermediate resultant quantity AC+B.

3. A floating point arithmetic unit for performing independent multiply and add operations in the execution of a multiply-add instruction on three operands A, B, and C, wherein A being the multiplicand, C being the multiplier and B being the addend, and each operand comprising data of a prescribed number p of bits in accordance with a given floating-point precision including one (1) sign bit indicating if a data represents a positive (+) or a negative (−) value, x exponent bits, and y mantissa bits, said arithmetic unit comprising:

(a) a multiplier unit including an input stage for receiving operands A and C and having an external datapath width of d bits, wherein p<d≦2p, and further wherein the input stage includes a respective buffer of b bits of zeros (0's) concatenated to the right of a respective least significant bit of each of operands A and C, wherein b is equal to d−p bits, said multiplier unit further including an output stage for conveying a product A*C including d upper order bits $AC_{UPPER}$ and d lower order bits $AC_{LOWER}$;

(b) a sticky collect unit for receiving $AC_{LOWER}$ and generating a sticky bit representative of a logical OR of all of the bits of $AC_{LOWER}$, wherein the sticky bit equals one (1) upon any of the bits of $AC_{LOWER}$ being one (1);

(c) an adder unit having an input stage for receiving $AC_{UPPER}$ and operand B and having an external datapath width of d bits, and further wherein the input stage includes a buffer of b bits of zeros (0's) concatenated to the right of a least significant bit of operand B, wherein b is equal to d minus p bits, said adder unit further including an output stage for providing a resultant quantity +/− $AC_{UPPER}$+/− B, wherein said multiplier unit, said sticky collect unit, and said adder unit implement an integrated multiply-add sequence;

(d) means for rounding the resultant quantity +/− $AC_{UPPER}$+/− B to a precision of bits in response to the sticky bit and further in accordance to a desired rounding mode, said rounding means further providing a multiply-add output of said arithmetic unit;

(e) means for detecting an occurrence of either a first risk condition or a second risk condition in connection with the resultant quantity prior to a rounding of the resultant quantity by said rounding means, the first risk condition indicative of an undesirable cancellation on the resultant quantity +/− $AC_{UPPER}$+/− B and the second risk condition indicative of a specific loss of precision in the resultant quantity +/− $AC_{UPPER}$+/− B, said risk condition detection means further for triggering a trap upon a detection of a risk condition, the trap for discarding the resultant quantity +/− $AC_{UPPER}$+/− B and further for initiating an extended multiply-add sequence; and (f) means for implementing the extended multiply-add sequence upon the three operands A, B, and C in response to the trap and providing a multiply-add output of said arithmetic unit, wherein the extended multiply-add sequence is selected for achieving mathematical compatibility with the integrated multiply-add sequence, wherein said multiplier unit includes an internal datapath width of 2d bits and said adder unit includes an internal datapath width of d+1 bits, further wherein said multiplier unit and said adder unit are interconnected by an external communication link of d bits and capable of producing resultant quantities having a precision of p≦d.

4. The floating point arithmetic unit according to claim 3, further wherein said multiplier unit and said adder unit are independent units capable of executing multiply-add sequences with full intermediate precision.

5. A floating point arithmetic unit for performing independent multiply and add operations in the execution of a multiply-add instruction on three operands A, B, and C, wherein A being the multiplicand, C being the multiplier and B being the addend, and each operand comprising data of a prescribed number p of bits in accordance with a given floating-point precision including one (1) sign bit indicating if a data represents a positive (+) or a negative (−) value, x exponent bits, and y mantissa bits, said arithmetic unit comprising:

(a) a multiplier unit including an input stage for receiving operands A and C and having an external datapath width of d bits, wherein p<d≦2p, and further wherein the input stage includes a respective buffer of b bits of zeros (0's) concatenated to the right of a respective least significant bit of each of operands A and C, wherein b is equal to d−p bits, said multiplier unit further including an output stage for conveying a product A*C including d upper order bits $AC_{UPPER}$ and d lower order bits $AC_{LOWER}$;

(b) a sticky collect unit for receiving $AC_{LOWER}$ and generating a sticky bit representative of a logical OR of all of the bits of $AC_{LOWER}$, wherein the sticky bit equals one (1) upon any of the bits of $AC_{LOWER}$ being one (1);

(c) an adder unit having an input stage for receiving $AC_{UPPER}$ and operand B and having an external datapath width of d bits, and further wherein the input stage includes a buffer of b bits of zeros (0's) concatenated to the right of a least significant bit of operand B, wherein b is equal to d minus p bits, said adder unit further including an output stage for providing a resultant quantity +/− $AC_{UPPER}$+/− B, wherein said multiplier unit, said sticky collect unit, and said adder unit implement an integrated multiply-add sequence;

(d) means for rounding the resultant quantity +/− $AC_{UPPER}$+/− B to a precision of p bits in response to the sticky bit and further in accordance to a desired rounding mode, said rounding means further providing a multiply-add output of said arithmetic unit;

(e) means for detecting an occurrence of either a first risk condition or a second risk condition in connection with the resultant quantity prior to a rounding of the resultant quantity by said rounding means, the first risk condition indicative of an undesirable cancellation on the resultant quantity +/− $AC_{UPPER}$+/− B and the second risk condition indicative of a specific loss of precision in the resultant quantity +/− $AC_{UPPER}$+/− B, said risk condition detection means further for triggering a trap upon a detection of a risk condition, the trap for discarding the resultant quantity +/− $AC_{UPPER}$+/− B and further for initiating an extended multiply-add sequence; and (f) means for implementing the extended multiply-add sequence upon the three operands A, B, and C in response to the trap and providing a multiply-add output of said arithmetic unit, wherein the extended multiply-add sequence is selected for achieving mathematical compatibility with the integrated multiply-add sequence, wherein said multiplier unit and said adder unit each further includes an 81-bit internal communication link including one (1) sign bit, sixteen (16) exponent bits, and sixty-four (64) mantissa bits.

6. A floating point arithmetic method for performing independent multiply and add operations in the execution of a multiply-add instruction on three operands A, B, and C, wherein A being the multiplicand, C being the multilplier and B being the addend, and each operand comprising data of a prescribed number p of bits in accordance with a given floating-point precision including one (1) sign bit indicating if a data represents a positive (+) or a negative (−) value, x exponent bits, and y mantissa bits, said method comprising the steps of:

(a) providing a multiplier unit including an input stage for receiving operands A and C and having an external datapath width of d bits, wherein p<d≦2p, and further wherein the input stage includes a respective buffer of b bits of zeros (0's) concatenated to the right of a respective least significant bit of each of operands A and C, wherein b is equal to d−p bits, said multiplier unit further including an output stage for conveying a product A*C including d upper order bits $AC_{UPPER}$ and d lower order bits $AC_{LOWER}$;

(b) providing a sticky collect unit for receiving $AC_{LOWER}$ and generating a sticky bit representative of a logical OR of all of the bits of $AC_{LOWER}$, wherein the sticky bit equals one (1) upon any of the bits of $AC_{LOWER}$ being one (1);

(c) providing an adder unit having an input stage for receiving $AC_{UPPER}$ and operand B and having an external datapath of d bits, and further wherein the input stage includes a buffer of b bits of zeros (0's) concatenated to the right of a least significant bit of operand B, wherein b is equal to d minus p bits, said adder unit further including an output stage for providing a resultant quantity +/− $AC_{UPPER}$+/− B, wherein the multiplier unit, the sticky collect unit, and the adder unit implement an integrated multiply-add sequence;

(d) rounding the resultant quantity +/− $AC_{UPPER}$+/− B to a precision of p bits in response to the sticky bit and further in accordance to a desired rounding mode, said rounding step further providing a multiply-add output;

(e) detecting an occurrence of either a first risk condition or a second risk condition in connection with the resultant quantity prior to a rounding of the resultant quantity by said rounding step, the first risk condition indicative of an undesirable cancellation on the resultant quantity +/− $AC_{UPPER}$+/− B and the second risk condition indicative of a specific loss of precision in the resultant quantity +/− $AC_{UPPER}$+/− B, said risk condition detection step further triggering a trap upon a detection of a risk condition, the trap for discarding the resultant quantity +/− $AC_{UPPER}$+/− B and further for initiating extended multiply-add sequence; and (f) implementing the extended multiply-add sequence upon the three operands A, B, and C in response to the trap and providing a multiply-add output, wherein the extended multiply-add sequence is selected for achieving mathematical compatibility with the integrated multiply-add sequence, wherein said extended multiply-add sequence implementation step includes providing a multiplier means having a narrowed datapath width of p bits for receiving operands A and C and performing a first and a second multiply for providing an intermediate product A*C including a partial product of p upper order bits $AC_{(2p-1:p)}$ and a partial product of p lower order bits $AC_{(p-1:0)}$;

executing three passes through an adder unit in accordance with the following operation:

$$AC+B=(AC_{(2p-1:p)}+B/2)+(AC_{(p-1:0)}+B/2),$$

and providing an intermediate resultant quantity AC+B of infinite precision; and rounding the intermediate resultant quantity AC+B to a precision of p bits and providing an output corresponding to the multiply-add output.

7. The floating point arithmetic method of claim 6, further wherein said step of executing three passes through an adder unit further includes shifting operand B and providing an output quantity B/2, and adjusting the lower order partial product $AC_{(p-1:0)}$ to be aligned with the quantity B/2 in preparation for an addition therewith, wherein the upper order partial product $AC_{(2p-1:p)}$ is added to the quantity B/2 to form a first intermediate quantity $AC_{(2p-1:p)}$+B/2, the aligned partial product $AC_{(p-1:0)}$ is added to the quantity B/2 to form a second intermediate quantity $AC_{(p-1:0)}$ +B/2, and the first and second intermediate quantities are added to form the intermediate resultant quantity AC+B.

8. A floating point arithmetic method for performing independent multiply and add operations in the execution of a multiply-add instruction on three operands A, B, and C, wherein A being the multiplicand, C being the multiplier and B being the addend, and each operand comprising data of a prescribed number p of bits in accordance with a given floating-point precision including one (1) sign bit indicating if a data represents a positive (+) or a negative (−) value, x exponent bits, and y mantissa bits, said method comprising the steps of:

(a) providing a multiplier unit including an input stage for receiving operands A and C and having an external datapath width of d bits, wherein p<d≦2p, and further wherein the input stage includes a respective buffer of b bits of zeros (0's) concatenated to the right of a respective least significant bit of each of operands A and C, wherein b is equal to d−p bits, said multiplier unit further including an output stage for conveying a product A*C including d upper order bits $AC_{UPPER}$ and d lower order bits $AC_{LOWER}$;

(b) providing a sticky collect unit for receiving $AC_{LOWER}$ and generating a sticky bit representative of a logical OR of all of the bits of $AC_{LOWER}$, wherein the sticky bit equals one (1) upon any of the bits of $AC_{LOWER}$ being one (1);

(c) providing an adder unit having an input stage for receiving $AC_{UPPER}$ and operand B and having an external datapath of d bits, and further wherein the input stage includes a buffer of b bits of zeros (0's) concatenated to the right of a least significant bit of operand B, wherein b is equal to d minus p bits, said adder unit further including an output stage for providing a resultant quantity +/− $AC_{UPPER}$+/− B, wherein the multiplier unit, the sticky collect unit, and the adder unit implement an integrated multiply-add sequence;

(d) rounding the resultant quantity +/− $AC_{UPPER}$+/− B to a precision of p bits in response to the sticky bit and further in accordance to a desired rounding mode, said rounding step further providing a multiply-add output;

(e) detecting an occurrence of either a first risk condition or a second risk condition in connection with the resultant quantity prior to a rounding of the resultant quantity by said rounding step, the first risk condition indicative of an undesirable cancellation on the resultant quantity +/− $AC_{UPPER}$+/− B and the second risk condition indicative of a specific loss of precision in the resultant quantity +/− $AC_{UPPER}$+/− B, said risk condition detection step further triggering a trap upon a detection of a risk condition, the trap for discarding the resultant quantity +/− $AC_{UPPER}$+/− B and further for initiating an extended multiply-add sequence; and (f) implementing the extended multiply-add sequence upon the three operands A, B, and C in response to the trap and providing a multiply-add output, wherein the extended multiply-add sequence is selected for achieving mathematical compatibility with the integrated multiply-add sequence, wherein the multiplier unit includes an internal datapath width of 2d bits and the adder unit includes an internal datapath width of d+1 bits, further wherein the multiplier unit and the adder unit are interconnected by an external communication link of d bits and capable of producing resultant quantities having a precision of p≦d.

9. The floating point arithmetic unit method of claim 8, further wherein the multiplier unit and said adder unit are independent units capable of executing multiply-add sequences with full intermediate precision.

10. A floating point arithmetic method for performing independent multiply and add operations in the execution of a multiply-add instruction on three operands A, B, and C, wherein A being the multiplicand, C being the multiplier and B being the addend, and each operand comprising data of a prescribed number p of bits in accordance with a given floating-point precision including one (1) sign bit indicating if a data represents a positive (+) or a negative (−) value, x exponent bits, and y mantissa bits, said method comprising the steps of:

(a) providing a multiplier unit including an input stage for receiving operands A and C and having an external datapath width of d bits, wherein p<d≦2p, and further wherein the input stage includes a respective buffer of b bits of zeros (0's) concatenated to the right of a respective least significant bit of each of operands A and C, wherein b is equal to d−p bits, said multiplier unit further including an output stage for conveying a product A*C including d upper order bits $AC_{UPPER}$ and d lower order bits $AC_{LOWER}$;

(b) providing a sticky collect unit for receiving $AC_{LOWER}$ and generating a sticky bit representative of a logical OR of all of the bits of $AC_{LOWER}$, wherein the sticky bit equals one (1) upon any of the bits of $AC_{LOWER}$ being one (1);

(c) providing an adder unit having an input stage for receiving $AC_{UPPER}$ and operand B and having an external datapath of d bits, and further wherein the input stage includes a buffer of b bits of zeros (0's) concatenated to the right of a least significant bit of operand B, wherein b is equal to d minus p bits, said adder unit further including an output stage for providing a resultant quantity +/− $AC_{UPPER}$+/− B, wherein the multiplier unit, the sticky collect unit, and the adder unit implement an integrated multiply-add sequence;

(d) rounding the resultant quantity +/− $AC_{UPPER}$+/− B to a precision of p bits in response to the sticky bit and further in accordance to a desired rounding mode, said rounding step further providing a multiply-add output;

(e) detecting an occurrence of either a first risk condition or a second risk condition in connection with the resultant quantity prior to a rounding of the resultant quantity by said rounding step, the first risk condition indicative of an undesirable cancellation on the resultant quantity +/− $AC_{UPPER}$+/− B and the second risk condition indicative of a specific loss of precision in the resultant quantity +/− $AC_{UPPER}$+/− B, said risk condition detection step further triggering a trap upon a detection of a risk condition, the trap for discarding the resultant quantity +/− $AC_{UPPER}$+/− B and further for initiating an extended multiply-add sequence; and (f) implementing the extended multiply-add sequence upon the three operands A, B, and C in response to the trap and providing a multiply-add output, wherein the extended multiply-add sequence is selected for achieving mathematical compatibility with the integrated multiply-add sequence wherein the multiplier unit and the adder unit each further includes an 81-bit internal communication link including one (1) sign bit, sixteen (16) exponent bits, and sixty-four (64) mantissa bits.

* * * * *

UNITED STATES PATENT AND TRADEMARK OFFICE
CERTIFICATE OF CORRECTION

PATENT NO. : 5,880,984
DATED : March 9, 1999
INVENTOR(S) : Burchfiel et al

It is certified that error appears in the above-identified patent and that said Letters Patent is hereby corrected as shown below:

On the title page: Item [54] and Column 1, line 3, should read

-- METHOD AND APPARATUS FOR PERFORMING HIGH-PRECISION MULTIPLY-ADD CALCULATIONS USING INDEPENDENT MULTIPLY AND ADD INSTRUCTIONS--.

Signed and Sealed this

Twentieth Day of July, 1999

Attest:

Attesting Officer

Q. TODD DICKINSON

Acting Commissioner of Patents and Trademarks